United States Patent
Busch, Jr.

[11] Patent Number: 5,942,107
[45] Date of Patent: Aug. 24, 1999

[54] APPARATUS FOR THE TREATMENT OF HAZARDOUS WASTE WATER

[76] Inventor: Joseph B. Busch, Jr., 15 Remington Dr., Edison, N.J. 08820

[21] Appl. No.: 09/149,508

[22] Filed: Sep. 8, 1998

Related U.S. Application Data

[60] Division of application No. 08/715,141, Sep. 18, 1996, Pat. No. 5,807,486, which is a continuation-in-part of application No. 08/332,660, Nov. 1, 1994, Pat. No. 5,558,775.

[51] Int. Cl.$^6$ ....................................................... C02F 1/44
[52] U.S. Cl. ........................ 210/195.2; 210/196; 210/199; 210/202; 210/203; 210/206
[58] Field of Search ..................................... 210/638, 639, 210/641, 650, 651, 652, 663, 666, 694, 712, 721, 722, 724, 725, 727, 748, 758, 759, 787, 806, 900, 909, 912, 195.1, 195.2, 196, 199, 202, 203, 206

[56] References Cited

U.S. PATENT DOCUMENTS

| | | | |
|---|---|---|---|
| 5,039,416 | 8/1991 | Loew et al. | 210/631 |
| 5,059,317 | 10/1991 | Marius et al. | 210/202 |
| 5,174,901 | 12/1992 | Smith | 210/806 |
| 5,227,071 | 7/1993 | Torline et al. | 210/806 |
| 5,259,972 | 11/1993 | MiyamAra et al. | 210/900 |
| 5,368,726 | 11/1994 | Masoomian | 210/202 |
| 5,374,356 | 12/1994 | Miller et al. | 210/641 |
| 5,558,775 | 9/1996 | Busch, Jr. | 210/638 |
| 5,807,486 | 9/1998 | Busch, Jr. | 210/638 |

*Primary Examiner*—Peter A. Hruskoci
*Attorney, Agent, or Firm*—Louis E. Marn

[57] ABSTRACT

There is disclosed a portable assembly for treating hazardous waste water having a plurality of paired filter units having filter mediums and operated at high filter rates to minimize solids build up wherein solids are caused to be smashed and broken by shear forces and wherein chemicals are sequentially added to facilitate solids reduction, to oxidize organic compounds and to precipitate dissolved solids and wherein the process stream is subjected to ultraviolet light to reduce organic loading and downstream ultra filtration units to further reduce solids followed by reverse osmosis and/or ionization treatment.

1 Claim, 1 Drawing Sheet

5,942,107

APPARATUS FOR THE TREATMENT OF HAZARDOUS WASTE WATER

RELATED APPLICATION

This is a Divisional Application of application Ser. No. 08/715,141 filed Sep. 18, 1996 now U.S. Pat. No. 5,807,486, which is a continuation-in-part of U.S. application Ser. No. 08/332,660, filed Nov. 1, 1994 now U.S. Pat. No. 5,558,775

BACKGROUND OF THE INVENTION

1. Field of the Invention

This invention relates to a process and apparatus for treating hazardous waste water, and more particularly to a mobile apparatus for the treatment of hazardous waste waters as established by the EPA Toxicity Characteristic Teaching Procedures Rules DOO4-D043 (Sep. 1, 1990) and F001 to F005 to form a treated or product water which is non-toxic and reusable or recyclable (zero discharge of waste water).

2. Background of the Invention

With increasing pressure of pollution control laws, diminishing potable drinking water resources, and in escalating water and sewer cost, U.S. and overseas industries are considering the alternative of industrial process waste water reclamation and reuse as a viable solution to such problems. On-site commercial and industrial waste water reclamation and reuse is becoming a basic cost of manufacturing and a means to reduce water, sewer, chemicals and energy costs for process, cooling, washing, rinsing and cleaning water uses.

Hazardous and solid waste regulations have greatly reduced the amount of waste a manufacturing business can generate. Federal regulatory bodies governing the management of hazardous waste define hazardous waste as any solid waste which has the potential to harm human life or the environment. Under the passage of the Resource Conservation and Recovery Act of 1976, large quantity generators are defined as those generating less than 1000 kg per month of hazardous waste.

The Hazardous and Solid Waste Amendment of 1984 has significantly changed such systems by defining the LQG as one generating 1000 kg (approximately 2200 lbs. or 270.5 gallons) per month of such waste. These changes have resulted in greatly increasing the number of regulated generators and the number of regulated waste as well as increasing the pressure on local bodies to ensure that hazardous waste is not being introduced into the municipal water stream.

Among the many large quantity generators affected by such regulations are oil companies, such as refiners and distribution terminals, electronic manufacturing companies, chemical companies, industrial dry cleaning and laundry establishments, etc. Numerous contaminants are generated by the automobile service center in everyday operation, such as in the cleaning and repairing of engine parts. Included among these contaminants are solvents, sediment, used oil, organic compositions, such as antifreeze and a wide variety of heavy metals including significant quantities of copper, zinc, mercury, chromium and lead. In the past, such wastes have been disposed in municipal sewerage systems, septic tanks and underground storage tanks. Today's methods are very costly in that special disposal is necessary and that such municipal systems have high pretreatment requirements prior to disposal as a commercial/industrial user.

The EPA Toxicity Characteristic Teaching Procedures Rules D004–D043 (Sep. 1, 1990) set forth the list of toxic wastes and F wastes that are treatable to produce a treated or product water essentially non-toxic and reusable or recyclable (0 discharge of waste water).

Generally, plants are being built with consideration for dedicated on-site facilities for treating such waste waters; however, there is a need for a portable assembly for treating any and all such waste waters which may be facilely moved from site to site to effectively treat any and all such process waste waters thereby obviating dedicated on-site facilities thereby substantially reducing capital investments while accomplishing the desired requirements of treating toxic waste to render the resulting product water recyclable or reusable.

In the copending U.S. application, Ser. No. 08/332,660, there is disclosed a portable assembly for treating hazardous waste water having a plurality of paired filter units having filter mediums and operated at high filter rates to minimize solids build up wherein solids are caused to be smashed and broken by shear forces and wherein chemicals are sequentially added to facilitate solids reduction, to oxidize organic compounds and to precipitate dissolved solids and wherein the process stream is subjected to ultraviolet light to reduce organic loading and downstream ultra filtration units to further reduce solids followed by reverse osmosis and/or ionization treatment.

While the process and apparatus of the aforementioned patent application is effected for treating hazardous waste water, there is the need to provide a more simplistic process and apparatus for treating hazardous waste water for immediate water reuse.

OBJECTS OF THE INVENTION

An object of the present invention is to provide an improved process and apparatus for treating hazardous waste waters.

Another object of the present invention is to provide an improved process and apparatus which may be readily moved from site to site and facilely connected to storage tanks for the treatment of hazardous waste waters.

Still another object of the present invention is to provide an improved portable assembly of a capacity to treat a hazardous waste water stream having toxic wastes to form recycled water.

Yet another object is to provide an assembly for treating hazardous waste water with minimal unit processes and operations.

SUMMARY OF THE INVENTION

These and other objects of the present invention are achieved by an improved process and apparatus for treating hazardous waste water having a plurality of paired filter units having filter mediums and operated at high filter rates to minimize solids build up wherein solids are caused to be smashed and broken by shear forces and wherein chemicals are sequentially added to precipitate dissolved solids, to facilitate solids reduction, to oxidize organic compounds and wherein the process stream is subjected to ultra filtration to further reduce solids and thence to ultraviolet light to reduce organic loading followed by reverse osmosis and/or ionization treatment.

BRIEF DESCRIPTION OF THE DRAWINGS

These and other objects of the present invention will become apparent upon consideration of the detailed disclosures especially when taken with the accompanying drawing which is a schematic flow diagram of the apparatus and process of the present invention.

BRIEF DESCRIPTION OF THE INVENTION

Figure 1:
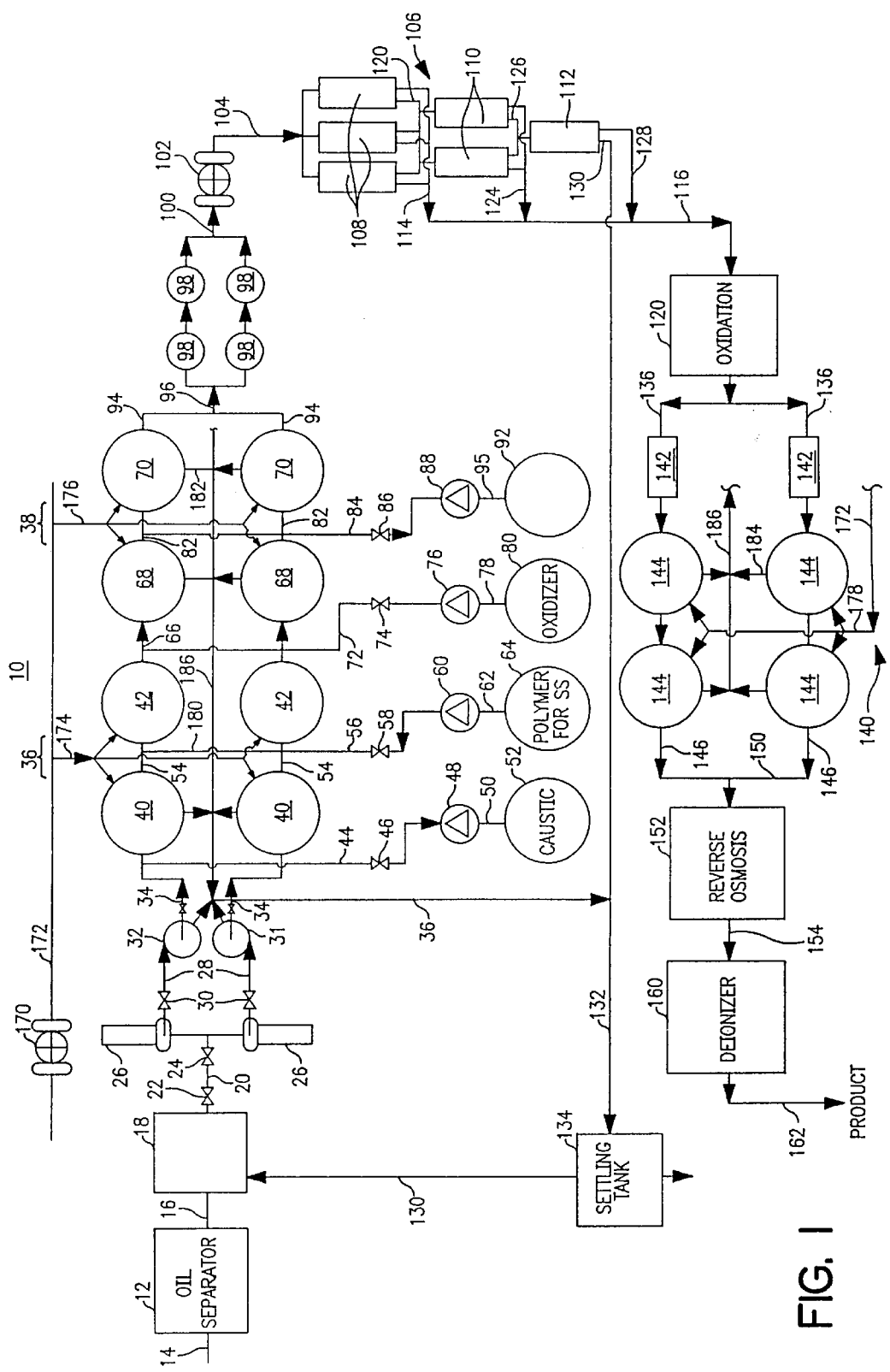

Referring now to the drawing, there is illustrated a combined chemical and physical assembly for treating commercial and/or industrial hazardous waste, generally indicated as 10. It is to be understood that equipment, such as certain conduits, valves, indicators and the like have been omitted from the drawing to facilitate the description hereof and placing of such equipment at appropriate places is deemed to be within the scope of those skilled in the art, as is the operation of filters. The process and apparatus of the present invention treats 100 gallons per minute of hazardous waste water and is provided, in part, with parallel trains having a capacity of 50 gallons per minute, as more fully hereinafter described.

The apparatus and process of the present invention includes a plurality of unit processes and unit operations for treating hazardous waste water which may be mounted on a portable unitary structure for site to site relocation. The apparatus 10 includes an oil/water separator 12 having an inlet conduit 14 for the hazardous waste water to be treated and an exit conduit 16 in fluid communication with a surge tank 18. The oil/water separator 12 is provided with three coalescing stages.

The surge tank 18 is in fluid communication by conduit 20 under the control of valve 22 and one way valve 24 with the suction side of pumps 26. The discharge side of the pumps 26 is in fluid communication by conduit 28 under the control of valves 30 with cyclone separators 32. The cyclone separators 32 are provided with overflow product outlet conduits 34 and bottom outlet conduits 36.

The product outlet conduit 34 of a cyclone separator 32 is in fluid communication with a plurality of paired filter units including primary multi-media filter assembly, generally indicated as 36 and secondary or polishing multi-media filter assembly, generally indicated as 38. It will be understood by one skilled in the art that when one of the paired filter units is on stream the other is being regenerated or is in standby readiness. The schematic flow diagram being simplified in the interest of clarity.

The primary multi-media filter assembly 36 is comprised of a paired filter units 40 and 42 layered with anthracite, sand, garnet and gravel (under drain). A conduit 44 under the control of valve 46 is connected to conduit 34 and is in fluid flow communication with the discharge side of a pump 48 with its suction side in fluid communication by conduit 50 with a storage tank 52 of a caustic, such as caustic soda, as more fully hereinafter described.

The filter units 40 are provided with outlet conduits 54 in fluid communication with filter units 42. A conduit 56 under the control of valve 58 is connected to the conduits 54 and is in fluid flow communication with the discharge side of a pump 60 with its suction side in fluid communication by conduit with a storage tank 64 of a cationic organic polymer, as more fully hereinafter described.

The filter units 42 are provided with a product outlet conduit 66 in fluid flow communication with paired filter units 68 and 70 of the polishing multi-media assembly 38. A conduit 72 under the control of a valve 74 is connected to the conduit 66 and is in fluid communication with the discharge side of a pump 76 with its suction side in fluid communication by line 78 with a storage tank 80 containing an oxidizer solution, as more fully hereinafter described. The filter units 68 and 70 are sequentially layered with a filter media comprised of anthracite, sand, garnet, garnet and gravel (under drain). The filter units 68 are provided with outlet conduit 82 in fluid communication with filter units 70. A conduit 84 under the control of valve 86 is in fluid flow of the discharge side of a pump 88 with its suction side in fluid communication by conduit 90 with a storage tank 92 of a material for precipitating metals, as more fully hereinafter described. The filter units 70 are provided with outlet conduits 94.

The conduits 94 are connected via conduit 96 to a plurality of paired in line micron cartridge filters 98. An outlet conduit 100 from the micron cartridge filters 98 is in fluid communication with the suction side of a high pressure pump 102. The discharge side of the high pressure pump 102 is in fluid flow communication by conduit 104 with an ultra stage filtration system, generally indicated as 106.

The ultra stage filtration system 106 is comprised of a first stage including three modules 108, a second stage comprised of two modules 110 and a third stage comprised of one module 112. A product outlet conduit 114 is connected to the discharge side of the first stage modules 108 in fluid flow communication with a conduit 116 with an oxidation tank 120. Modules 108 of the first stage ultra stage filtration system 106 are provided with bottoms outlet conduits 120 for passing rejected waste to the second stage modules 110. A product outlet conduit 124 is connected to the second stage modules 110 of the ultra stage filtration system 106 in fluid flow communication with conduit 116 to the oxidation tank 120. Bottoms outlet conduits 126 are provided to the second stage modules 110 of the ultra stage filtration system 106 for passage of rejected waste to the last stage module 112 of the ultra filtration assembly system 106. The third stage module 112 is provided with a product outlet conduit 128 in fluid flow communication with the conduit 116 to the oxidation tank 120. A bottoms outlet conduit 130 is provided for the last state module 112 for passage of rejected waste by conduit 132 to the settling tank 134. The settling tank is in fluid flow communication by line 136 to the surge tank 18 for recycle of a water stream.

The oxidation tank 120 is in fluid flow communication by conduit 136 with an organic reduction filter assembly, generally indicated as 140 via an ultraviolet sterilization assembly, generally indicated as 142, as more fully hereinafter described. The organic reduction filter assembly 140 is comprised of paired filter united 144 layered with a carbon and gravel media and include outlet conduits 146.

The product water streams in the outlet conduits 146 from the organic reduction filter assembly 140 is combined in conduit 150 and is introduced into the reverse osmosis assembly 152. An outlet conduit 154 is connected to the reverse osmosis assembly 152 in fluid flow communication with deionizer assembly 160. A product outlet conduit 162 is connected to the deionizer assembly 160 for the product recyclable water.

A filter regeneration pump 170 is provided, connected by a main conduit 172 via conduits 174, 176 and 178 to filter units 40/42; 68/70 and 144 of the filter assemblies 36, 38 and 140, respectively. The filter unites 40/42; 68/70 and 144 are provided with waste outlet conduits 180, 182 and 184, respectively, connected to a main outlet conduit 186 in fluid flow relationship with bottoms outlet conduits 34 from the cyclone separators 32 passed by conduit 164 to the settling tank 134 by conduit 132.

Waste water to be treated is initially analyzed qualitatively and quantitatively to establish operating parameters for all unit operations as well as unit processes requiring predetermined qualitative additions of processing chemicals, such as the oxidizers, polymers, etc. It will be understood by one skilled in the art that some chemicals need not be added or that all components of the assembly 10 may not be required in the treatment of a hazardous waste water stream. Also, in the interest of understanding and simplicity, the following describes a single train of the assembly.

Hazardous waste water, for example, including all potential toxic waste, oil and the like, as hereinbefore described, in conduit 14 is introduced into the oil/water separator 12 wherein oil droplets are merged into larger ones which rise to the surface permitting the removal of processed waste water having oil particles of less than about 1 micron. The oil/water separator 12 operates at a slight vacuum to avoid emulsification of oil in downstream units and reduces the free oil and grease content to less than about 10 ppm.

Processed waste water withdrawn from the oil/water separator 12 in conduit 16 is introduced into the surge tank 18 and passed by pumps 26 to the cyclone separators 32 wherein heavy particles of a specific gravity greater than 1.0 are separated from the process stream being treated. Cyclone separators 32 are operated at a high rate turbidity reduction at low pressure losses of from about 4.0 to 8.0 psi wherein about 98% of the suspended particles of greater than about 75 microns (0.003 inches) are removed as a bottom stream. The bottom stream of suspended particles from the cyclone separators 32 is passed by conduit 36 via conduit 164 and thence through conduit 132 to the settling tank 134 for recycling purposes.

The overflow process stream from the cyclone separators 32 is passed by conduit 34 to the paired filter units 40. As hereinabove discussed, the fluid to be processed is alternately passed through one of the filter units 40. Caustic soda in tank 52 is passed by line 44 and admixed in conduits 34 with the process stream from the cyclone separator 32 to neutralize acids thereby forming inorganic salts which precipitate out of the solution. The caustic solution dissolves carbon dioxide thereby helping to reduce organic loading by extraction at pH above about 8.5 and to precipitate hydroxides of heavy metals which are generally insoluble. Generally of from 50 to 140 ppm of caustic is added as a function of carbon dioxide loading. The filter units 40 are operated at a flow rate of from 70 to 105 gallons per minute, preferably 7.0 gallons per minute per ft.$^2$ thereby to remove particulate material down to about 10 microns.

A further processed stream is withdrawn from the filter units 40 by conduit 54 and passed to the filter units 42. The filter units 42 are similarly operated at a flow rate of from 70 to 105 gallons per minute, preferably 7 gallons per minute per ft.$^2$ (as compared to conventional or dual media filters) wherein particulate material of greater than about 10 microns are removed during passage through the filter media in the filter units 40. To facilitate suspended solids reduction, a polymer is introduced by conduit 56 from tank 64 into the further processed stream in conduit 54 prior to introduction into the filter units 42 of the primary filter assembly 36. Based on the principle of deep bed contact, coagulation, flocculation, sedimentaton and filtration is effective on colloidal matter prepared within five (5) minutes of contact thereby to remove up to 90% of suspended solids down to about 5 microns.

From the primary filter units 42, the thus processed stream is passed by conduit 66 to the polishing multimedia filter unit 68, together with an oxidizing chemical, such as hydrogen peroxide or the like, introduced by conduit 72 from the storage tank 80 in an amount sufficient to oxidize organic compounds in the waste water being processed. The strength of the oxidizing chemical is a function of the C.O.D. and T.O.C. loading up to about 2,000 ppm or 0.2% by weight. Thus, in the conduits 66, hydrocarbons present in the stream being treated are converted to carbon dioxide and water providing rapid destruction of chlorinated and non-chlorinated hydrocarbons and humic acid. Carbon dioxide acts as a strong organic solvent. Many organic chemicals are soluble in carbonic acid, but are of limited solubility in water.

An alkali metal precipitant in the conduit 84 from tank 92 is introduced into the liquid stream being processed in conduit 82 prior to introduction into the filter units 70 of the filter assembly 38. Of from about 2 to 15 ppm of the alkali metal precipitant is added per 1 ppm of heavy metal ions. In the filter unit 70 of the polishing filter assembly 38, particles are also removed down to 10 ppm. In the filter units 70 of the assembly 38, colloidal matter for high clarity filtration is removed of up to about 90% of suspended solids in the liquid being processed. By effecting rapid coagulation, flocculation and sedimentation, no sludge is produced as a by product for disposal.

A thus treated processed stream in conduit 96 containing trace amounts of organics is withdrawn from the filter units 70 of the assembly 38 and passed through micron cartridge filters 98 and thence through conduit 104 to the stages of the ultra filtration assembly generally indicated as 106, wherein product overflow water streams containing inorganics and total dissolved solids are passed by conduits 114, 124 and 128 to the oxidation tank 120 via conduit 116. The stages of the ultra filtration system 106 are based on membrane technology. In the ultra filtration assembly 106, emulsified oil and suspended solids are concentrated and separated from a processed liquid stream with filtration media being replaced from time-to-time as required.

In oxidation tank 120, the thus processed stream in line 116 may be further contacted with an oxidizing chemical, such as ozone, hydrogen peroxide and the like, to further convert hazardous organic compounds into environmentally safe compounds and carbon dioxide.

The thus processed stream in conduit 94 is passed through ultraviolet sterilization unit 96 prior to introduction into the organic reduction filter assembly 54. In the ultraviolet sterilization unit 96, the liquid being processed is subjected to ultraviolet light to further reduce organic loading.

In the reverse osmosis system 142, the liquid stream in conduit 140 is treated to remove total dissolved solids and inorganics (metals) with the removal of submicron particles with a specific gravity less than about 1.0, particle size of 0.01 to 0.001 microns of molecular weights of 100 to 300.

Deionizer unit 160 is in fluid communication by conduit 162 with the reverse osmosis system 142. The deionizer unit operates to remove, if necessary, dissolved solids (especially heavy metals) for final polishing.

The filter units of the various filtration assemblies are regenerated in a manner known to one skilled in the art, generally when the pressure differential between the inlet/outlet reaches about 10 psig. Regeneration is effected in a period of about 20 minutes at a back flow rate of about 90 gallons per minute.

While the present invention has been described with reference to a preferred embodiment, it will be understood by one skilled in the art that the present invention is applicable to a dedicated site having predetermined and defined hazardous waste water effluents whereby units of the preferred embodiment may be selectively combined (without certain outer units to treat such hazardous waste water. For example, if the hazardous waste water includes only hydrocarbons, those unit processes and operations required for the removal of heavy metals obviously are not required for a dedicated site and vice-versa.

While the invention herein has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed:

1. An assembly for treating a hazardous waste water stream, which comprises:

cyclone separator means to remove particles of a specific gravity greater than 1.0 from said waste water stream;

a first filter assembly means in communication with said cyclone separator means, said first filter assembly means to reduce organic loading in said waste water stream by precipitation with a caustic material, said first filter assembly means further comprising a means for the introduction of said caustic material into said waste water stream;

a second filter assembly means in communication with said first filter assembly means, said second filter assembly means to reduce suspended solids in said waste water stream facilitated with a polymeric material, said second assembly filter means including means for introduction of said polymeric material into said waste water stream;

a third filter means in communication with said second filter assembly means, for removal of organic compounds in said waste water stream by oxidation with an oxidizing chemical, said third filter means further including a means for introduction of said oxidizing chemical into said waste water stream;

a fourth filter means, in communication with said third filter means, said fourth filter means for removing heavy metals in said waste water stream precipitated by an alkali addition, said fourth filter means further including a means for introduction of said alkali into said waste water stream;

a micron filtration means in communication with said fourth filter means, said micron filtration means to further remove inorganic and total dissolved solids from said waste water stream;

an ultra filtration means in communication with said micron filtration means to separate emulsified oil and suspended solids from said waste water stream;

a fifth filter assembly means in communication with said ultra filtration means, said fifth filter assembly means for removal of organic compounds from said waste water stream; and a reverse osmosis means in communication with said fifth filter assembly means, said reverse osmosis means for removal of total dissolved solids and inorganics from said waste water stream in order to form recyclable water.

* * * * *